US008129854B2

(12) United States Patent
Patten (10) Patent No.: US 8,129,854 B2
(45) Date of Patent: Mar. 6, 2012

(54) OCEAN WAVE ENERGY EXTRACTOR (76) Inventor: Kenneth Sykes Patten, Cathedral City, CA (US)

(*) Notice: Subject to any disclaimer, the term of this patent is extended or adjusted under 35 U.S.C. 154(b) by 0 days.

(21) Appl. No.: 12/927,623

(22) Filed: Nov. 18, 2010

(65) Prior Publication Data
US 2011/0175359 A1 Jul. 21, 2011

Related U.S. Application Data (60) Provisional application No. 61/336,160, filed on Jan. 19, 2010.

(51) Int. Cl.
F03B 13/10 (2006.01)
(52) U.S. Cl. .......................... 290/53; 290/42
(58) Field of Classification Search .......... 290/42, 290/43, 53, 54
See application file for complete search history.

(56) References Cited

U.S. PATENT DOCUMENTS

| 4,110,630 | A |   | 8/1978  | Hendel        | 290/53  |
|-----------|---|---|---------|---------------|---------|
| 4,851,704 | A | * | 7/1989  | Rubi          | 290/53  |
| 5,842,838 | A | * | 12/1998 | Berg          | 417/331 |
| 6,229,225 | B1|   | 5/2001  | Carroll       | 290/53  |
| 6,291,904 | B1|   | 9/2001  | Carroll       | 290/53  |
| 6,476,511 | B1|   | 11/2002 | Yemm et al.   | 290/42  |
| 6,731,019 | B2|   | 5/2004  | Burns et al.  | 290/42  |
| 6,768,216 | B1|   | 7/2004  | Carroll et al.| 290/42  |
| 7,105,939 | B2| * | 9/2006  | Bednyak       | 290/42  |
| 7,140,180 | B2|   | 11/2006 | Gerber et al. | 60/496  |
| 7,224,077 | B2|   | 5/2007  | Allen         | 290/1   |
| 7,239,038 | B1| * | 7/2007  | Zimmerman et al.| 290/54 |
| 7,348,764 | B2|   | 3/2008  | Stewart et al.| 322/24  |
| 7,737,569 | B2| * | 6/2010  | Hench         | 290/42  |
| 7,737,572 | B2| * | 6/2010  | Welch et al.  | 290/53  |
| 7,781,903 | B2|   | 8/2010  | Buffard et al.| 290/42  |
| 7,989,975 | B2| * | 8/2011  | Clement et al.| 290/53  |
| 8,046,108 | B2| * | 10/2011 | Hench         | 700/286 |
| 2007/0130929 | A1 |   | 6/2007 | Khan et al.   | 60/398  |

OTHER PUBLICATIONS

Henk Polinder and Mattia Scuotto, "Wave Energy Converters and their Impact on Power Systems", Nov. 18, 2005, pp. 1-9.

* cited by examiner

Primary Examiner — Nicholas Ponomarenko
(74) Attorney, Agent, or Firm — Imperium Patent Works; T. Lester Wallace; Amir V. Adibi

(57) ABSTRACT

An ocean wave energy extractor includes a first flotation device that contains a second flotation device and a mechanism for extracting energy. The wave energy extractor floats in seawater and extracts energy from waves. A propagating wave rotates the first flotation device relative to the second flotation device. The mechanism is connected to both flotation devices and generates energy from this relative rotation. In one example, a first flotation device includes a spherical chamber with a flotation collar, and a second flotation device supported by a joint at a center of the chamber. A wave approaching from any direction rotates the first flotation device relative to the second flotation device, and a mechanism for extracting energy generates electrical energy from the relative rotation. The chamber shields inner components from seawater and adverse ocean conditions. The wave energy extractor need not be moored to a location to extract energy from waves.

19 Claims, 9 Drawing Sheets

SIDE CROSS SECTION OF WAVE ENERGY EXTRACTOR IN OCEAN WATER

WAVE ENERGY EXTRACTOR IN THE OCEAN

FIG. 1

WAVE ENERGY EXTRACTOR

FIG. 2

SIDE CROSS SECTION OF WAVE ENERGY
EXTRACTOR IN OCEAN WATER

FIG. 3

TOP CROSS SECTION OF WAVE ENERGY
EXTRACTOR IN THE OCEAN

FIG. 4

SIDE CROSS SECTION OF SECOND FLOTATION DEVICE
FIG. 5

✕ = CENTER LOCATION

WAVE ENERGY EXTRACTOR IN OCEAN BEFORE ARRIVAL
OF AN INCOMING WAVE
FIG. 6

FIG. 7

WAVE ENERGY EXTRACTOR AT THE TOP OF THE CREST
OF THE WAVE AS IT PROPAGATES

FIG. 8

RECEDING WAVE ROTATES THE WAVE ENERGY EXTRACTOR
CLOCKWISE AROUND THE CENTER LOCATION

FIG. 9

WAVE ENERGY EXTRACTOR AFTER THE WAVE HAS PROPAGATED

FIG. 10

SIDE CROSS SECTION OF WAVE ENERGY EXTRACTOR WITH MOORING CAPABILITY
(ANOTHER EMBODIMENT)

FIG. 11

WAVE ENERGY EXTRACTOR WITH A CYLINDRICAL CHAMBER
(ANOTHER EMBODIMENT)
FIG. 12

WAVE ENERGY FARM
FIG. 13

OCEAN WAVE ENERGY EXTRACTOR

CROSS REFERENCE TO RELATED APPLICATION

This application claims the benefit under 35 U.S.C. §119 of provisional application Ser. No. 61/336,160, entitled "A Device For Exploiting Ocean Wave Power", filed Jan. 19, 2010. The subject matter of provisional application Ser. No. 61/336,160 is incorporated herein by reference.

TECHNICAL FIELD

The described embodiments relate to extracting energy from ocean waves.

BACKGROUND INFORMATION

Ocean wave energy extractors are devices used to extract energy from ocean waves. These devices usually convert the extracted energy into electrical energy that is supplied to a power station. Such devices typically include a power take-off system and two components, one component that is fixed and a second component that moves relative to the fixed component. These devices generate electric energy from a relative displacement between the first and second components. For example, an incoming wave displaces the second component relative to the first component, and this relative displacement drives an electrical generator of the power take-off system. However, the first component often must be moored to a fixed location in order to induce a relative displacement between the components.

Several limitations exist with such devices. These devices often include components and materials that are sensitive to salinity of ocean water and tend to deteriorate, resulting in increased maintenance costs. Ocean climate is volatile and areas of the ocean are often subject to extreme weather conditions that may damage sensitive components exposed to the ocean water. Additionally, these devices typically need to be moored to a seabed or to a shore in order to generate power. Mooring these devices tend to increase manufacturing and maintenance costs, and mooring requirements limit where these devices can be deployed. An improved solution is desired that overcomes these limitations.

SUMMARY

An ocean wave energy extractor includes a first flotation device that contains a second flotation device and a mechanism for extracting energy. The ocean wave energy extractor floats in seawater and extracts energy from ocean waves. A propagating wave rotates the first flotation device relative to the second flotation device. The mechanism for extracting energy is connected to both flotation devices and generates energy from this relative rotation. The ocean wave energy extractor does not need to be moored to a seabed or land to extract energy. Protection of sensitive components from the ocean is provided by the first flotation device that contains the second flotation device and the mechanism for extracting energy. Minimal exposure to the ocean minimizes the likelihood that the inside components will be damaged by adverse ocean climate or will deteriorate from exposure to seawater.

In one embodiment, an ocean wave energy extractor includes a first flotation device that has a spherical chamber with a flotation collar, a second flotation device, and a mechanism for extracting energy. Both the second flotation device and the mechanism for extracting energy are contained inside the chamber. The chamber also includes a spheroid joint at a center of the chamber, and a bottom surface of the second flotation device is attached to the spheroid joint. A fluid fills a lower portion of the chamber and supports the second flotation device in a horizontal position. In this example, the mechanism for extracting energy is a power take-off system with hydraulic rams attached to the top surface of the second flotation device. An incoming wave engages the flotation collar of the first flotation device rotating the first flotation device relative to the second flotation device inside the chamber. The power take-off system is fixed to an upper portion of the first flotation device, and the relative rotation causes hydraulic rams to compress a fluid of the power take-off system thereby generating electrical energy. The spherical shape of the first flotation device is rotated by an incoming wave propagating in any direction. The wave energy extractor does not need to be moored to a fixed location and does not need to be oriented in a certain fashion to operate. The chamber shields inner components from seawater and adverse ocean conditions, minimizing the likelihood of damage and deterioration caused by the ocean.

In another embodiment, an ocean wave energy extractor includes a first flotation device that has a cylindrical chamber with a flotation collar, a second flotation device, and a mechanism for extracting energy. Similarly to the spherical embodiment, the cylindrical embodiment includes a joint at center of the chamber and a fluid that fills a lower portion of the chamber that supports the second flotation device. During operation, the cylindrical portion of the chamber must face incoming waves, and so both ends of the ocean wave energy extractor must be moored to a fixed location to maintain this orientation.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

Reference will now be made in detail to some embodiments of the invention, examples of which are illustrated in the accompanying drawings.

DETAILED DESCRIPTION

Figure 1:
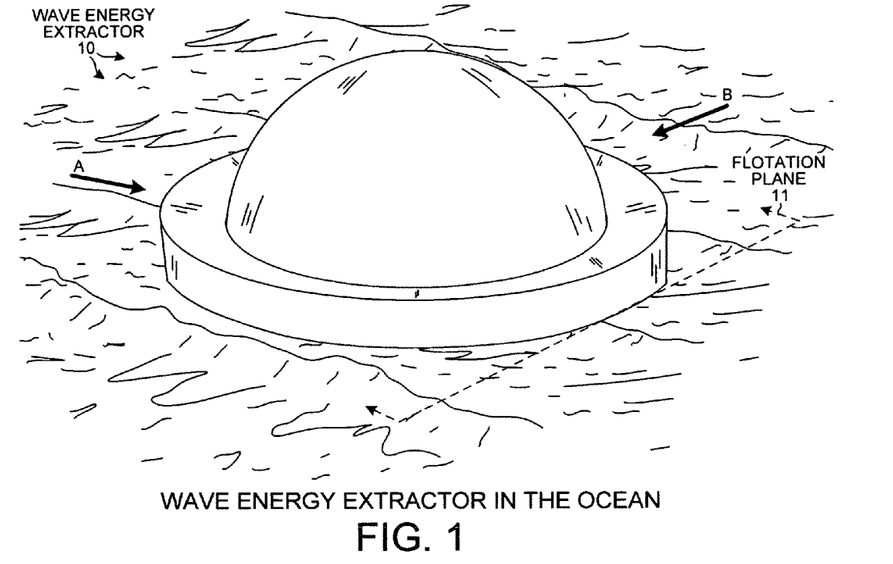
FIG. 1 is a diagram of a perspective view of a wave energy extractor floating on an ocean surface.

FIG. 1 is a diagram of a perspective view of an ocean wave energy extractor 10 floating on an ocean surface in accordance with one novel aspect. Wave energy extractor 10 floats on flotation plane 11 and extracts energy from propagating waves. This energy extracted from waves is converted into electrical energy that can be supplied onto a power grid. An incoming wave rotates the wave energy extractor relative to an inner device, and this relative rotation engages a mechanism that generates electrical energy, such as a piston. In this example, wave energy extractor 10 is approximately forty-two feet in diameter. If wave energy extractor 10 is deployed in an ocean region with swells approximately ten feet high with a period of eight seconds (or in other words, ten foot waves passing every eight seconds), then wave energy extractor 10 can generate approximately 210 kW of power.

During operation, wave energy extractor 10 does not need to be moored to a fixed location (such as a seabed or shore) because of its spherical structure. Typically, a wave incoming from any direction will engage wave energy extractor 10 because of its spherical aspect, and so wave energy extractor 10 does not need to be oriented in a specific position relative to the direction of incoming waves. For example, waves incoming along direction A would engage wave energy extractor 10 in a similar fashion as would waves incoming along direction B, assuming the waves were of a similar magnitude.

Figure 2:
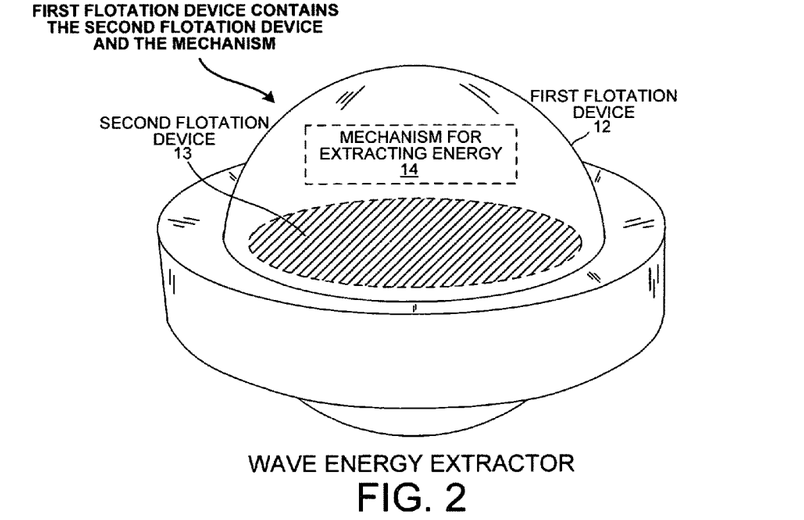
FIG. 2 is a diagram of a perspective view of the wave energy extractor 10 of FIG. 1.

FIG. 2 is a diagram of a perspective view of ocean wave energy extractor 10. In this example, wave energy extractor includes a first flotation device 12, a second flotation device 13 and a mechanism for extracting energy 14. First flotation device 12 has a diameter that is at least five times as long as a thickness of second flotation device 13. Second flotation device 13 and mechanism for extracting energy 14 are contained inside first flotation device 12, and are shielded from the ocean. A propagating wave will rotate first flotation device 12 relative to second flotation device 13, and this relative rotation will engage mechanism 14 that will then generate electrical energy.

Figure 3:
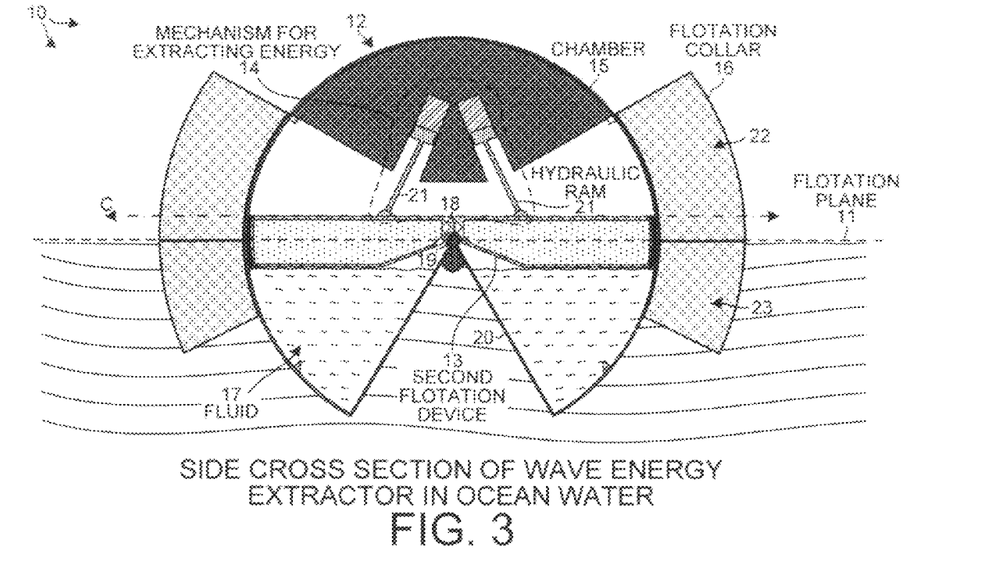
FIG. 3 is a diagram of a side cross-sectional view of wave energy extractor 10.

FIG. 3 is a diagram of a cross-sectional view of the wave energy extractor 10 of FIG. 1 floating in the ocean in accordance with one novel aspect. Wave energy extractor 10 has a first flotation device 12 that includes a chamber 15 and a flotation collar 16 disposed on an outer perimeter of the chamber 15. Chamber 15 contains second flotation device 13 and mechanism for extracting energy 14, and an amount of fluid 17. Flotation collar 16 is of a buoyancy that can maintain wave energy extractor 10 and all its components floating on seawater. In this example, chamber 15 is of a spherical shape and is approximately thirty feet in diameter. A lower surface of second flotation device 13 includes socket 18 that attaches to a spheroid joint 19, and fluid 17 supports second flotation device 13 in a horizontal orientation parallel to flotation plane 11. Spheroid joint 19 is formed at center location of chamber 15 disposed above conical surface 20. Mechanism for extracting energy 14 comprises a power take-off system that includes a plurality of hydraulic rams 21. The power take-off system is adapted to generate and store electrical energy when hydraulic rams 21 are compressed and decompressed. Each hydraulic ram 21 is attached to an upper surface of second flotation device 13, and are evenly distributed in a circular fashion around the upper surface. By attaching hydraulic rams 21 in this fashion, rotation of the first flotation device causes a set of hydraulic rams to compress and another set to decompress thereby engaging the power take-off system and generating electrical energy. Flotation collar 16 further includes an upper portion 22 and a lower portion 23. Flotation collar 16 provides further protection to the inner components of wave energy extractor 10 by providing another barrier from the ocean.

Figure 4:
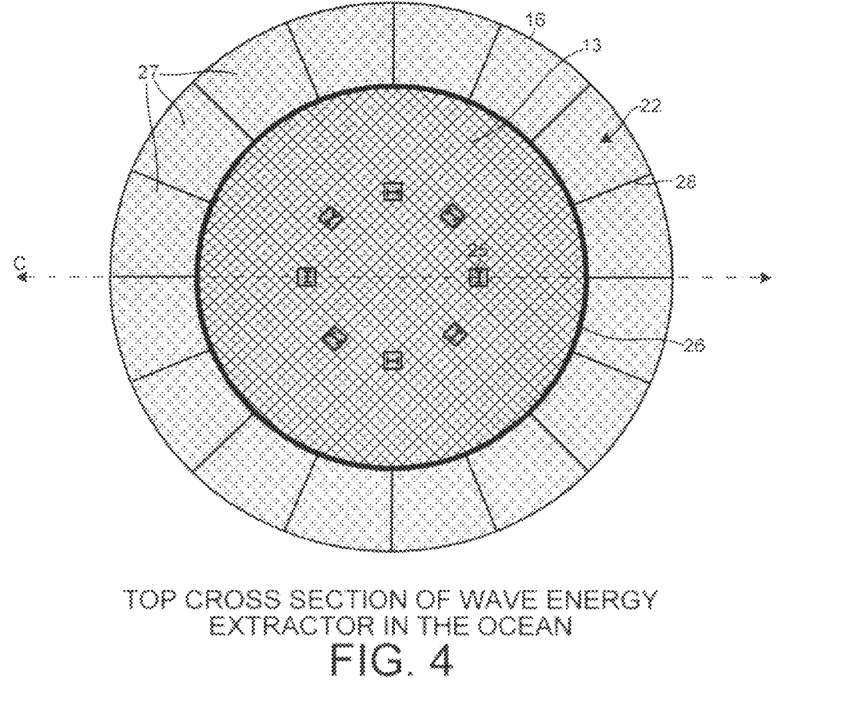
FIG. 4 is a diagram of a top cross-sectional view of wave energy extractor 10.

FIG. 4 is a diagram of a top cross-sectional view of the wave energy extractor of FIG. 1. Hydraulic rams 21 attach in a circular, evenly spaced fashion, at connection locations 25 on the upper surface of second flotation device 13. Sealant 26 is disposed along the perimeter of second flotation device 13 and prevents fluid 17 from leaking into upper portion of first flotation device 12 during rotation. Upper portion 22 of flotation collar 16 comprises a plurality of buoyant elements 27. Flotation collar 16 is adapted to include compartments containing buoyant elements 27, and each compartment is separated by a partition 28. If a buoyant element is damaged when wave energy extractor 10 is deployed in the ocean, then the damaged buoyant element can be replaced without requiring the entire flotation collar 16 to be brought to shore for repairs. Thus, the compartmental structure of flotation collar 16 simplifies maintenance of wave energy extractor 10.

Figure 5:
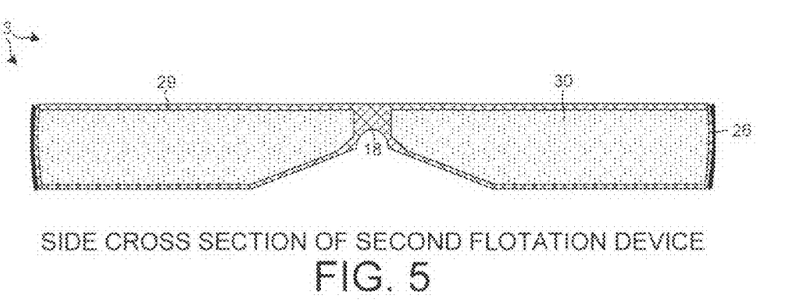
FIG. 5 is a diagram of an expanded cross-sectional view of the second flotation device 13.

FIG. 5 is a diagram of an expanded cross-sectional view of second flotation device 13 of FIG. 3. Sealant structure 26 is disposed around the perimeter and prevents fluid 17 from leaking into the upper portion of chamber 15. If fluid 17 enters the upper portion of chamber 15, then fluid 17 can damage the power take-off system or hydraulic rams 21. A metal layer 29 encloses buoyant element 30, and metal layer 29 prevents exposure of fluid 17 to buoyant materials of buoyant element 30.

Figure 6:
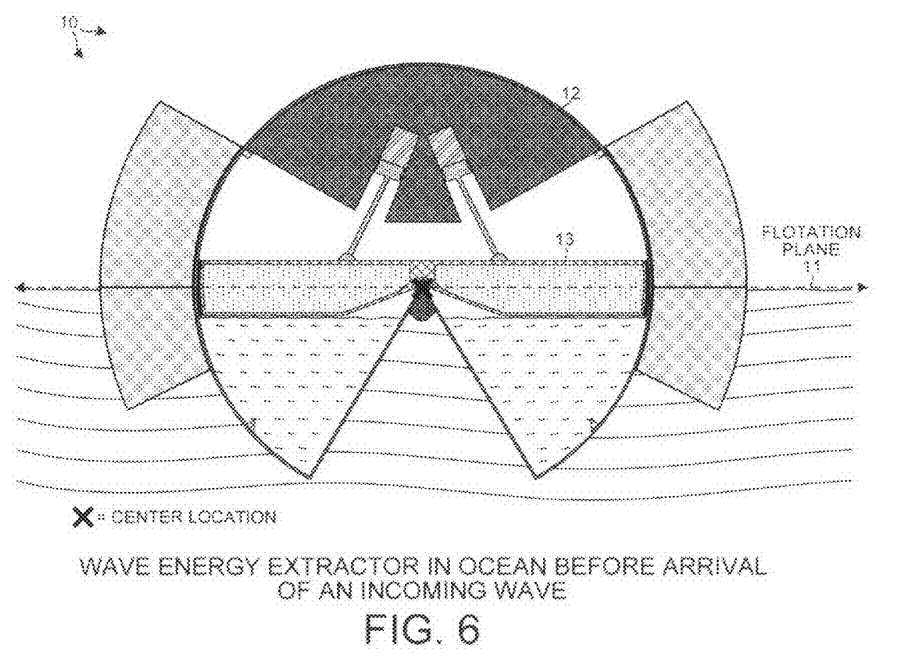
FIG. 6 is a diagram of a cross-sectional view of the wave energy extractor prior to an incoming wave.

FIG. 6 is a diagram of a cross-sectional view of the wave energy extractor prior to an incoming wave. Both the first flotation element 12 and the second flotation element 13 rest parallel to flotation plane 11. Wave energy extractor 10 extracts an optimal amount of energy when a center of second flotation device 13 is located at a center location of wave energy extractor 10 because a wave incoming along any direction will engage the power take-off system and generate electrical energy.

Figure 7:
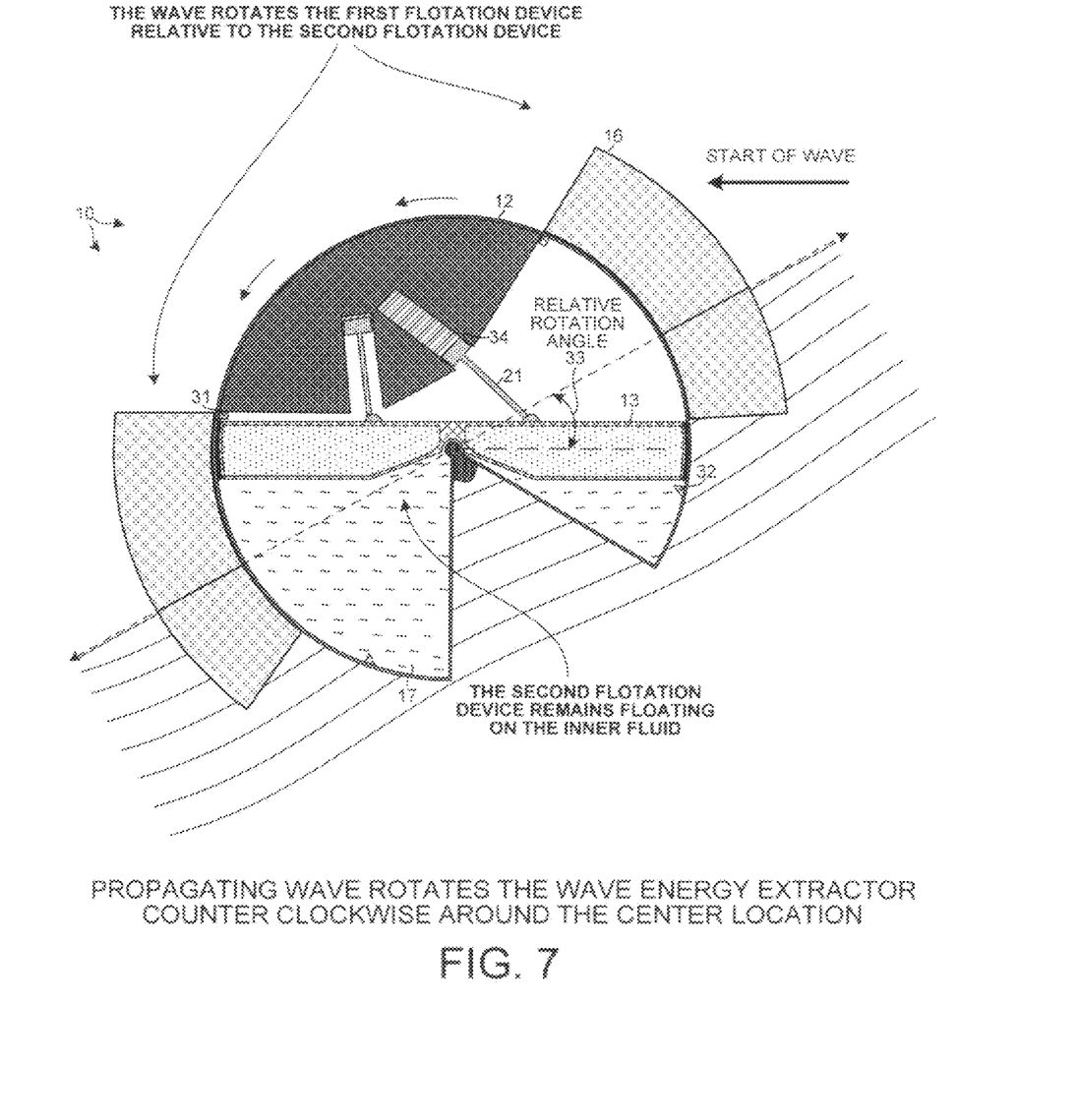
FIG. 7 is a diagram of a cross-sectional view of the wave energy extractor that illustrates operation upon the start of a propagating wave.

FIG. 7 is a diagram of a cross-sectional view of the wave energy extractor 10 that illustrates operation upon receiving an incoming wave. The right side of flotation collar 16 is displaced upwards by the propagating wave and the left side is displaced downwards, and this induces a counter-clockwise rotation of the first flotation device 12 relative to the second flotation device 13. The amount of energy extracted from the wave is proportional to the relative rotation angle 33. During this rotation, second flotation device 13 remains supported by fluid 17. Fluid 17 provides a resistive force to second flotation device 13 due to its buoyancy and this in turn causes left portion of hydraulic rams 21 to compress and right portion of hydraulic rams 21 to decompress. Consequently, fluids 34 of the power take-off system are compressed and decompressed resulting in a pressure difference that drives an electric generator of the power take-off system (not shown). For additional information on mechanisms for extracting energy and how to construct the power take-off system of wave energy extractor 10, see: 1) U.S. Pat. No. 6,731,019, by Burns et al.; 2) U.S. Pat. No. 7,348,764, by Stewart et al.; and 3) U.S. Pat. No. 7,781,903, by Buffard et al. (the entire subject matter of the above-listed three patent documents is incorporated herein by reference).

Stops 31 and 32 help prevent first flotation device from rotating to such an extent that second flotation device 13 makes physical contact with a surface of the power take-off system. Such contact could cause damage to either the power take-off system or the flotation devices. If the income wave is of a large enough amplitude, then the second flotation device 13 will contact stop 31 and the relative rotation angle will reach its maximum value. After contact, both flotation devices may begin to rotate together. However, no energy can be extracted from this rotation beyond the maximum relative rotation angle because there is no relative rotation between the flotation devices.

Figure 8:
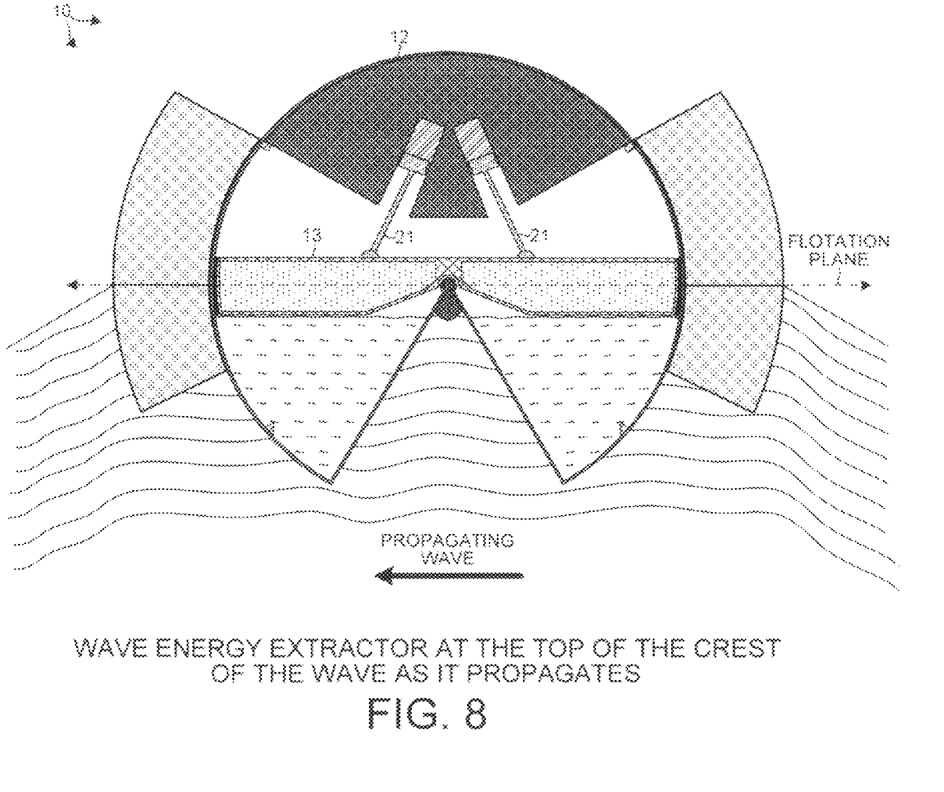
FIG. 8 is a diagram of a cross-sectional view of the wave energy extractor that illustrates its operation at the crest of the propagating wave.

FIG. 8 is a diagram of a cross-sectional view of the wave energy extractor 10 that illustrates its operation when it is floating above the crest of the propagating wave. Both flotation devices 12 and 13 are parallel and hydraulic rams 21 return to their initial positions.

Figure 9:
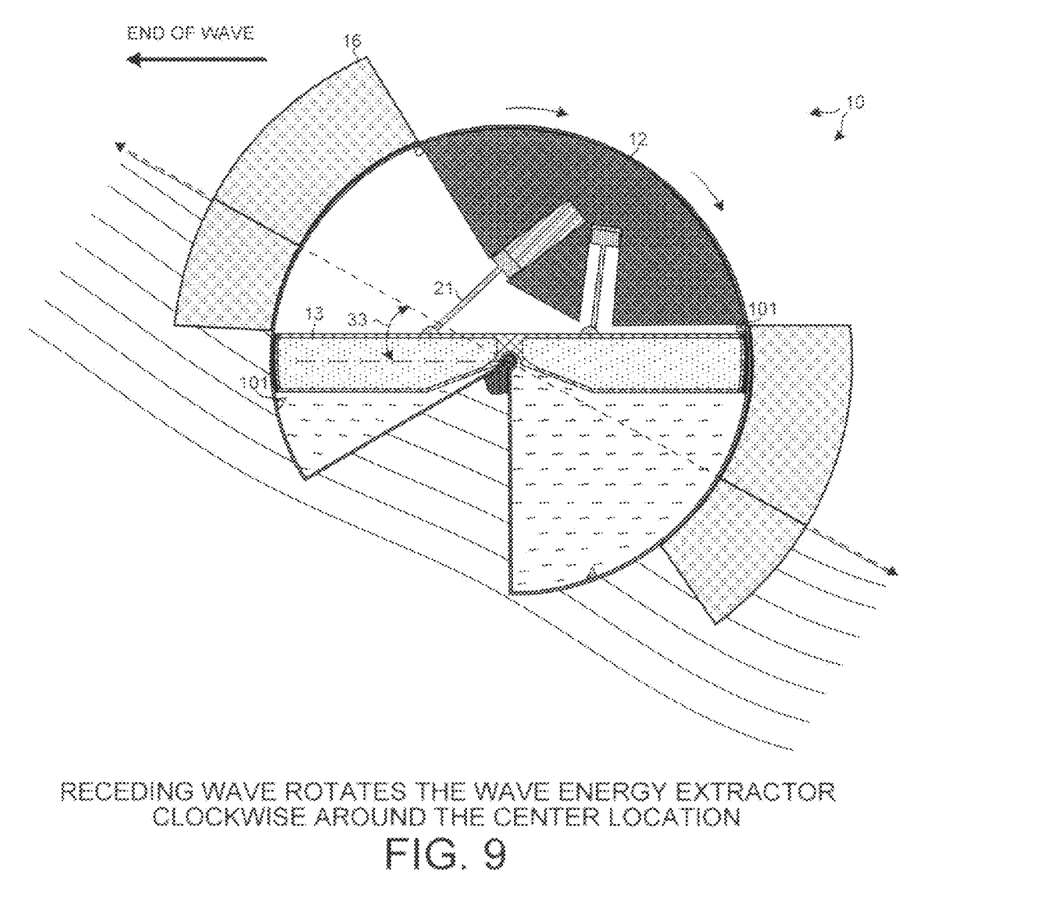
FIG. 9 is a diagram of a cross-sectional view of the wave energy extractor that illustrates its operation when the propagating wave is receding.

FIG. 9 is a diagram of a cross-sectional view of the wave energy extractor that illustrates its operation when the wave is receding. The end of the propagating wave displaces the left portion of flotation collar 16 upwards and displaces the right portion of flotation collar 16 downwards, causing a clockwise rotation of first flotation device 12 relative to second flotation device 13. Left portion of hydraulic rams 21 are decompressed and the right portion are compressed due to the resistive force provided by second flotation device 13 supported by fluid 17.

Figure 10:
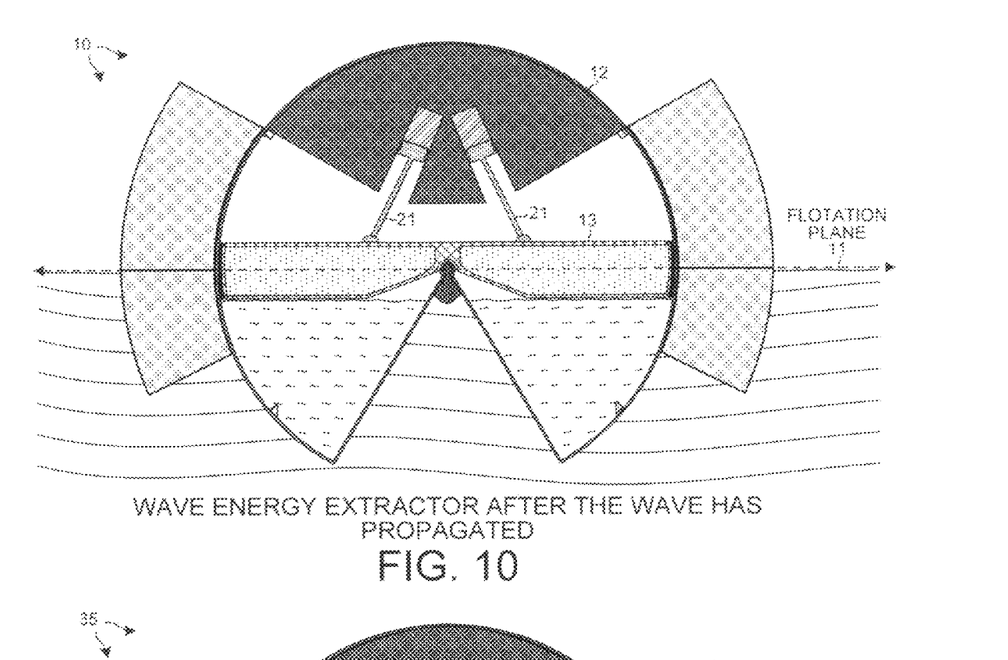
FIG. 10 is a diagram of a cross-sectional view of the wave energy extractor after the wave has propagated past the wave energy extractor.

FIG. 10 is a diagram of a cross-sectional view of the wave energy extractor 10 after the wave has propagated past. Both flotation devices 12 and 13 are parallel to flotation plane 11 and hydraulic rams 21 return to their initial positions. The power take-off system stores the electrical energy generated by the passing wave.

Figure 11:
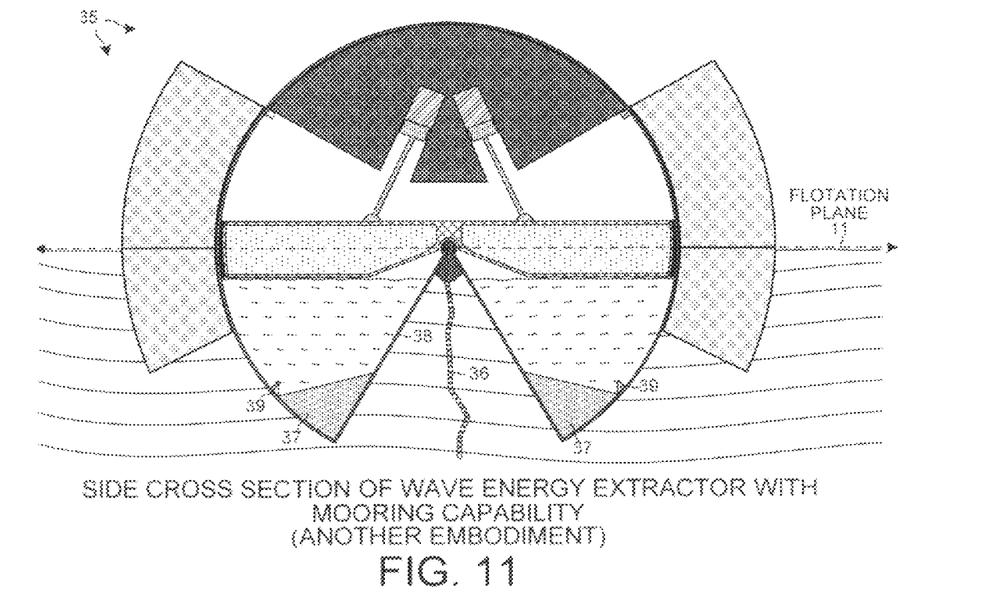
FIG. 11 is a diagram of a cross-sectional view of a wave energy extractor moored to a fixed location.

FIG. 11 is a diagram of a cross-sectional view of a wave energy extractor moored to a fixed location. In this example, a wave energy extractor 35 includes a mooring device 36 that attaches wave energy extractor 35 to a fixed location, such as a seabed or a shore. The mooring device 36 may include conductors coupled to the power take-off system used to extract electrical energy generated by wave energy extractor 35. Wave energy extractor 35 also includes extra support member 37 that provides further support to conical surface 38 and stop 39.

Figure 12:
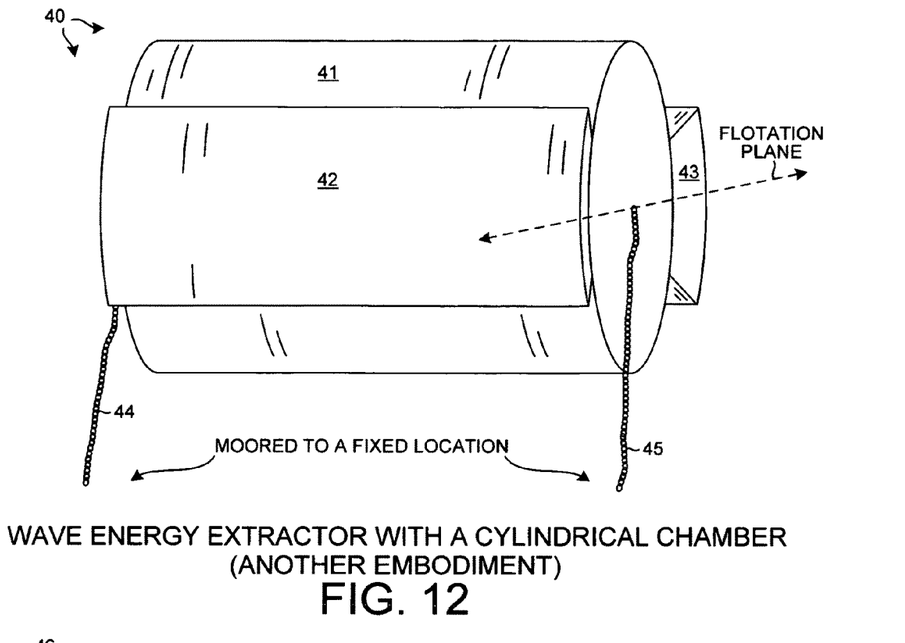
FIG. 12 is a diagram of a perspective view of a wave energy extractor with a cylindrical chamber.

FIG. 12 is a diagram of a perspective view of a wave energy extractor with a cylindrical chamber. Wave energy extractor 40 includes a first flotation device comprising a chamber 41 with an elongated cylindrical body and flotation collars 42 and 43. Similar to the spherical shaped embodiment of FIG. 1, cylindrical chamber 41 contains the second flotation device and the mechanism for extracting energy (not shown). In order to extract energy from propagating waves, the cylindrical body must be incident to incoming waves so that flotation collars 42 and 43 will rotate relative to the second flotation device contained inside chamber 41. Therefore, wave energy extractor 40 must be moored at both ends via mooring devices 44 and 45 so that the cylindrical body remains incident to the incoming waves.

Figure 13:
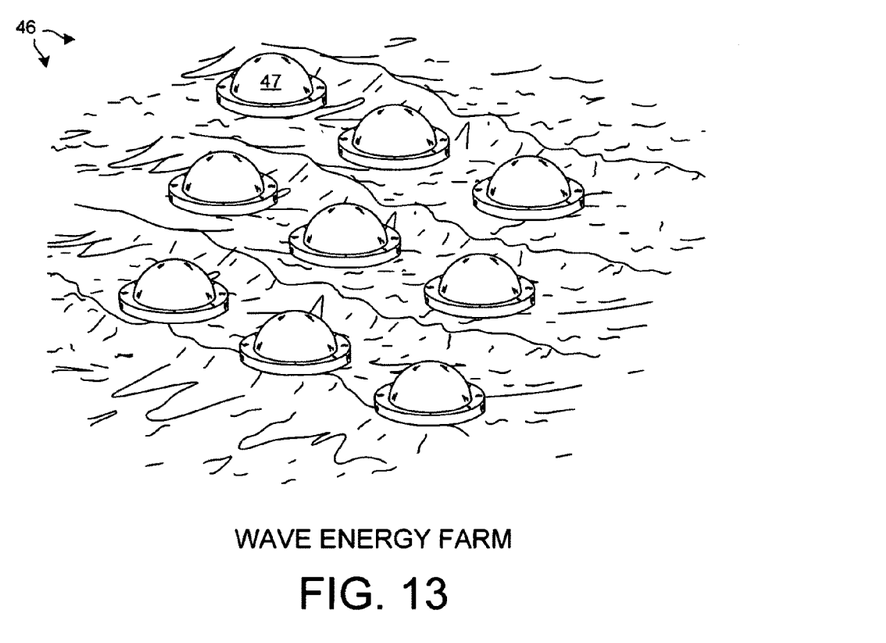
FIG. 13 is a diagram of a wave energy farm comprising a plurality of wave energy extractors moored to a fixed location.

FIG. 13 is a diagram of a wave energy farm 46 comprising a plurality of ocean wave extractors 47 deployed in a region of ocean. Wave energy extractors 47 are moored to a power station located at a seabed or on land via mooring devices (not shown). The mooring devices maintain wave energy extractors 47 in place and minimize the likelihood that they collide and cause damage to each other. Additionally, the mooring devices also include conductors that are coupled to the power station, and these conductors supply the electrical energy generated by wave energy extractors 47 to the power station.

Figure 14:
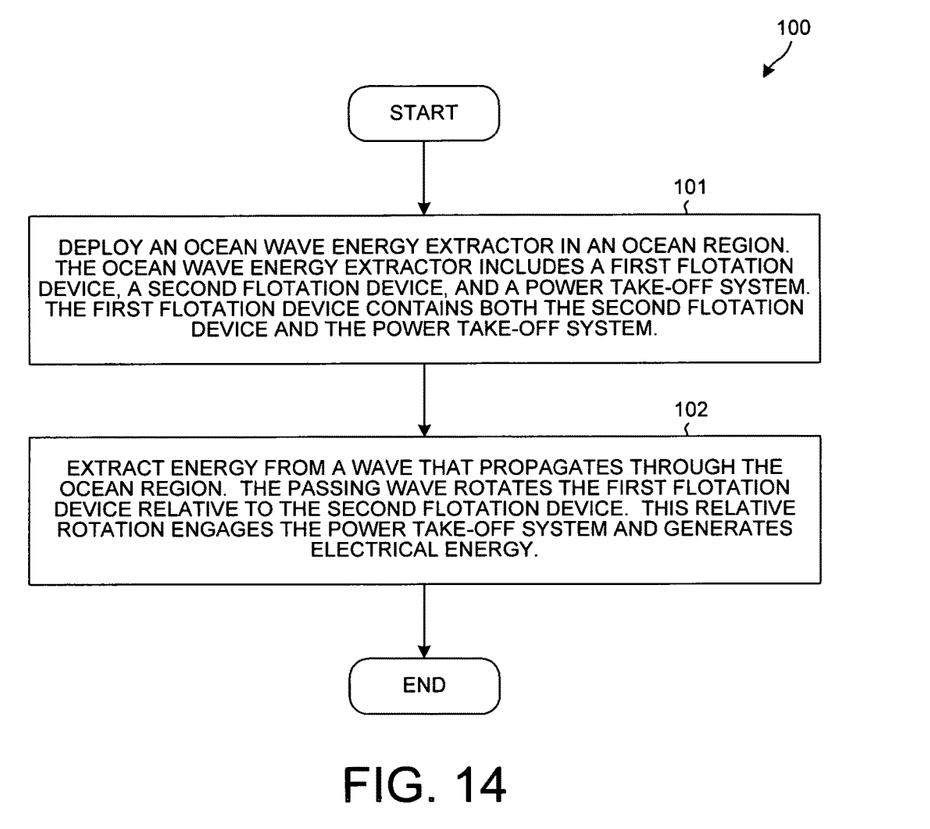
FIG. 14 is a flowchart in accordance with one novel aspect.

FIG. 14 is a flowchart 100 in accordance with one novel aspect. In a first step (step 101), an ocean wave energy extractor is deployed in a region of ocean. The ocean wave energy extractor includes a first flotation device, a second flotation device, and a power take-off system. The first flotation device contains the second flotation device and the power take-off system. For example, in FIG. 1, ocean wave energy extractor 10 is deployed in an ocean region and floats on flotation plane 11. Wave energy extractor 10 includes a first flotation device 12 that contains a second flotation device 13 and a mechanism for extracting energy 14.

In a second step (step 102), energy is extracted from a wave that propagates through the ocean region. The passing wave rotates the first flotation device relative to the second flotation device, and the power take-off system generates electrical energy from this relative rotation. For example, in FIG. 7, an incoming wave rotates flotation collar 16 and engages hydraulic rams 21. The power take-off system generates electrical energy from the compression and decompression of hydraulic rams 21. The amount of electrical energy that is generated is proportional to a relative rotation angle 33.

Although certain specific exemplary embodiments are described above in order to illustrate the invention, the invention is not limited to the specific embodiments. For example, the power-take off system may not involve hydraulic rams 21 compressing fluid 34. Instead, a power-take off system may use air bags or air pumps in order to generate electrical energy. Accordingly, various modifications, adaptations, and combinations of various features of the described embodiments can be practiced without departing from the scope of the invention as set forth in the claims.

What is claimed is:

1. An apparatus comprising:
   a first flotation device that extends in a flotation plane, wherein the first flotation device is adapted to support an amount of fluid;
   a second flotation device adapted to float on the fluid, wherein the second flotation device extends in the flotation plane, and wherein the first flotation device includes a chamber that contains the second flotation device; and
   a mechanism for extracting energy when the first flotation device rotates relative to the second flotation device, wherein the mechanism is connected to the first flotation device and the mechanism is also connected to the second flotation device, and wherein the first flotation device seals the second flotation device and the mechanism for extracting energy from an outer fluid.

2. The apparatus of claim 1, wherein the chamber forms a shape, and wherein the shape is taken from the group consisting of: a sphere, and a cylinder.

3. The apparatus of claim 1, wherein the chamber is substantially spherical and has a diameter of a first length, wherein the second flotation device has a thickness of a second length, wherein the first length is at least five times the second length.

4. The apparatus of claim 1, wherein the first flotation device includes a joint that is disposed at a center location of the apparatus, wherein the second flotation device is attached to the joint such that the second flotation device is free to rotate around at least two axes that extend in the flotation plane.

5. The apparatus of claim 1, wherein the mechanism for extracting energy is a power take-off system, wherein the power take-off system is adapted to generate energy from the rotation of the first flotation device relative to the second flotation device, and wherein the rotation engages the power take-off system.

6. The apparatus of claim 5, wherein an element of the power take-off system is coupled to the second flotation device such that the rotation of the first flotation device relative to the second flotation device engages the element thereby generating electrical energy, and wherein the element is taken from the group consisting of: a hydraulic pump, a compressed air pump, and an airbag.

7. The apparatus of claim 1, wherein the apparatus generates a first quantity of energy under an ocean condition if it is not moored to a surface, wherein the apparatus generates a second quantity of energy under the ocean condition if it is moored to the surface, and wherein the first quantity of energy is substantially equivalent to the second quantity of energy.

8. The apparatus of claim 1, wherein the first flotation device further comprises:
  a flotation collar that is adapted to maintain the apparatus floating in seawater; and
  a chamber that contains the second flotation device and the mechanism for extracting energy, wherein the flotation collar is disposed along a perimeter of the chamber, and wherein the chamber seals the second flotation device and the mechanism from the seawater.

9. The apparatus of claim 1, wherein the second flotation device further comprises:
  a sealant disposed along a perimeter of the second flotation device, wherein the sealant prevents the mechanism for extracting energy from being exposed to the fluid contained inside the first flotation device.

10. A method comprising:
  (a) deploying an ocean wave energy extractor in an ocean region, wherein the ocean wave energy extractor includes a first flotation device, a second flotation device, and a power take-off system, and wherein the second flotation device and the power take-off system are contained inside the first flotation device; and
  (b) extracting energy from a wave propagating through the region, wherein the wave rotates the first flotation device relative to the second flotation device thereby engaging the power take-off system.

11. The method of claim 10, wherein the first flotation device includes a chamber and a flotation collar, wherein the flotation collar is disposed around an outer surface of the chamber, wherein the chamber contains the second flotation device and the power take-off system, and wherein the chamber hermetically seals the second flotation device and the power take-off system from a fluid of the ocean region.

12. The method of claim 11, wherein the chamber has a diameter of a first length, wherein the second flotation device has a thickness of a second length, wherein the first length is at least five times the second length.

13. The method of claim 10, wherein the first flotation device includes a joint disposed at a center location of the ocean wave energy extractor, wherein the second flotation device is attached to the joint such that the second flotation device is free to rotate around the joint.

14. The method of claim 10, wherein an element of the power take-off system is coupled to the second flotation device such that the rotation of the first flotation device relative to the second flotation device engages the element thereby generating electrical energy, and wherein the element is taken from the group consisting of: a hydraulic pump, a compressed air pump, and an airbag.

15. The method of claim 10, wherein the deploying of (a) does not involve mooring the ocean wave energy extractor.

16. An apparatus comprising:
  a flotation device; and
  means for extracting energy from an ocean wave, wherein the ocean wave rotates the flotation device around a center location of the apparatus, wherein the ocean wave propagates along a direction and the means for generating energy operates independent of the direction of the ocean wave, and wherein the means is contained within the flotation device.

17. The apparatus of claim 16, wherein the flotation device includes a chamber that contains the means, and wherein the chamber seals the means from an outer fluid.

18. The apparatus of claim 16, wherein the means is also for generating electrical energy from a rotation of the flotation device around a center location.

19. The apparatus of claim 16, wherein the means is also for storing energy extracted from the ocean wave.

* * * * *